(12) United States Patent
Shor et al.

(10) Patent No.: US 10,360,140 B2
(45) Date of Patent: Jul. 23, 2019

(54) PRODUCTION SAMPLING FOR DETERMINING CODE COVERAGE

(71) Applicant: HEWLETT PACKARD ENTERPRISE DEVELOPMENT LP, Houston, TX (US)

(72) Inventors: Boaz Shor, Yehud (IL); Gil Pearl, Yehud (IL); Ohad Assulin, Yehud (IL); Inbar Shani, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 103 days.

(21) Appl. No.: 15/032,667

(22) PCT Filed: Nov. 27, 2013

(86) PCT No.: PCT/US2013/072390
§ 371 (c)(1),
(2) Date: Apr. 28, 2016

(87) PCT Pub. No.: WO2015/080742
PCT Pub. Date: Jun. 4, 2015

(65) Prior Publication Data
US 2016/0259714 A1  Sep. 8, 2016

(51) Int. Cl.
*G06F 11/36* (2006.01)

(52) U.S. Cl.
CPC ...... *G06F 11/3676* (2013.01); *G06F 11/3616* (2013.01)

(58) Field of Classification Search
CPC ........................................ G06F 11/3672–3692
See application file for complete search history.

(56) References Cited

U.S. PATENT DOCUMENTS

| | | | | | |
|---|---|---|---|---|---|
| 4,853,851 | A | * | 8/1989 | Horsch | G06F 11/3636 714/38.1 |
| 5,050,168 | A | * | 9/1991 | Paterson | G06F 11/3664 714/34 |
| 5,761,408 | A | * | 6/1998 | Kolawa | G06F 11/3676 714/38.1 |
| 5,784,553 | A | * | 7/1998 | Kolawa | G06F 11/3676 714/38.1 |

(Continued)

OTHER PUBLICATIONS

Lingannpally et al., A Multipurpose Code Coverage Tool for Java, published by IEEE, Proceedings of the 40th Hawaii International Conference on System Sciences, pp. 1-10 (Year: 2007).*

(Continued)

*Primary Examiner* — Thuy Dao
*Assistant Examiner* — Zheng Wei

(57) ABSTRACT

Example embodiments relate to determining code coverage based on production sampling. In example embodiments, a production execution data set that includes metrics for code units of a software application is obtained, where the metrics include input and output values for each of the code units and an average execution count for each of the code units. Further, application code execution is tracked during a testing procedure of the software application to determine executed lines of code. At this stage, production code coverage of the software application is determined based on the production execution data set and the executed lines of code.

10 Claims, 3 Drawing Sheets

(56) References Cited

U.S. PATENT DOCUMENTS

| | | | |
|---|---|---|---|
| 6,536,036 B1* | 3/2003 | Pavela | G06F 11/3676 707/999.104 |
| 6,959,431 B1* | 10/2005 | Shiels | G06F 11/3676 714/38.12 |
| 7,356,804 B2 | 4/2008 | Blumenthal et al. | |
| 7,617,415 B1* | 11/2009 | Kadakia | G06F 11/3676 714/26 |
| 7,861,226 B1* | 12/2010 | Episkopos | G06F 11/3696 717/124 |
| 8,381,184 B2 | 2/2013 | Jojhnson et al. | |
| 8,402,317 B1 | 3/2013 | Portal et al. | |
| 8,473,907 B1* | 6/2013 | Zandi | G06F 11/3616 714/38.1 |
| 8,898,647 B2* | 11/2014 | Sobolev | G06F 11/3676 717/130 |
| 8,990,778 B1* | 3/2015 | Allocca | G06F 11/3692 717/126 |
| 9,189,372 B2* | 11/2015 | Adler | G06F 11/3676 |
| 9,292,419 B1* | 3/2016 | Kintali | G06F 11/3676 |
| 9,436,586 B1* | 9/2016 | Fagen | G06F 11/362 |
| 9,619,373 B2* | 4/2017 | Alexander | G06F 11/368 |
| 9,632,916 B2* | 4/2017 | Alexander | G06F 11/368 |
| 2005/0071818 A1* | 3/2005 | Reissman | G06F 11/3672 717/127 |
| 2005/0160405 A1* | 7/2005 | Lunia | G06F 8/41 717/124 |
| 2005/0210199 A1* | 9/2005 | Dimpsey | G06F 9/30181 711/137 |
| 2005/0210339 A1* | 9/2005 | Dimpsey | G06F 11/3676 714/57 |
| 2005/0210439 A1* | 9/2005 | Dimpsey | G06F 11/3476 717/100 |
| 2005/0210450 A1* | 9/2005 | Dimpsey | G06F 9/3836 717/120 |
| 2005/0210451 A1* | 9/2005 | Dimpsey | G06F 9/3824 717/120 |
| 2005/0210452 A1* | 9/2005 | Dimpsey | G06F 11/3466 717/120 |
| 2005/0223357 A1 | 10/2005 | Banerjee et al. | |
| 2006/0101404 A1* | 5/2006 | Popp | G06F 11/3688 717/124 |
| 2006/0195724 A1* | 8/2006 | Filho | G06F 11/3466 714/35 |
| 2007/0011656 A1* | 1/2007 | Kumamoto | G06F 11/362 717/124 |
| 2008/0307391 A1* | 12/2008 | Goel | G06F 11/3676 717/115 |
| 2009/0287729 A1* | 11/2009 | Chen | G06F 11/3676 |
| 2010/0180258 A1* | 7/2010 | Takahashi | G06F 11/3616 717/124 |
| 2010/0262866 A1* | 10/2010 | Nir-Buchbinder | G06F 11/3616 714/38.1 |
| 2011/0004868 A1* | 1/2011 | Bharadwaj | G06F 11/3676 717/135 |
| 2011/0022551 A1* | 1/2011 | Dixon | G06F 11/3616 706/12 |
| 2011/0047531 A1* | 2/2011 | Wang | G06F 11/3676 717/130 |
| 2011/0145653 A1* | 6/2011 | Broadfoot | G06F 11/3604 714/38.1 |
| 2011/0197176 A1 | 8/2011 | Muharsky et al. | |
| 2012/0159448 A1* | 6/2012 | Arcese | G06F 11/28 717/124 |
| 2012/0304010 A1 | 11/2012 | Opstad et al. | |
| 2012/0317550 A1* | 12/2012 | Lindahl | G06F 11/3656 717/128 |
| 2013/0232473 A1* | 9/2013 | Braun | G06F 11/3676 717/129 |
| 2013/0298110 A1* | 11/2013 | Boden | G06F 11/3676 717/125 |
| 2014/0201703 A1* | 7/2014 | Boden | G06F 11/3676 717/101 |
| 2014/0258991 A1* | 9/2014 | Adler | G06F 11/3676 717/128 |
| 2015/0046909 A1* | 2/2015 | Ligman | G06F 11/3688 717/131 |
| 2017/0161065 A1* | 6/2017 | Gruver | G06F 9/30003 |

OTHER PUBLICATIONS

Shahid et al., An Evaluation of Test Coverage Tools in Software Testing, published by 2011 International Conference on Telecommunication Technology and Applications Proc .of CSIT vol. 5 (2011) © (2011) IACSIT Press, Singapore, pp. 216-222 (Year: 2011).*

Agrawal, H., Dominators, Super Blocks, and Program Coverage, Jan. 16-19, 1994, 10 pages http://www.utdallas.edu/~ewong/SYSM-6310/03-Lecture/Hira-01.pdf > on pp. 25-34.

Kodre, R. et al., Statistical Sampling Based Approach to Alleviate Log Replay Testing, Apr. 9-11, 2008, 4 pages http://ieeexplore.ieee.org/stamp/stamp.jsp?arnumber=4539587.

Korean Intellectual Property Office, International Search Report and Written Opinion, Aug. 27, 2014, Daejeon Metropolitan City, Republic of Korea, 12 pages.

Unknown, Benefits of Code Coverage, 2005, 6 pages http://www.jetbrains.com/dotcover/documentation/articies/benefits.html.

"EMMA: a free Java code coverage tool", retrieved from the Internet on Nov. 15, 2018, 2 pages. <http://emma.sourceforge.net/>.

Amber Frauenholtz, "Atlassian Clover is now open source—Atlassian Blog", Apr. 11, 2017, 3 pages. <https://www.atlassian.com/blog/announcements/atlassian-clover-open-source>.

Cobertura, "A code coverage utility for Java", retrieved from the Internet on Nov. 15, 2018. 1 page. <http://cobertura.github.io/cobertura/>.

* cited by examiner

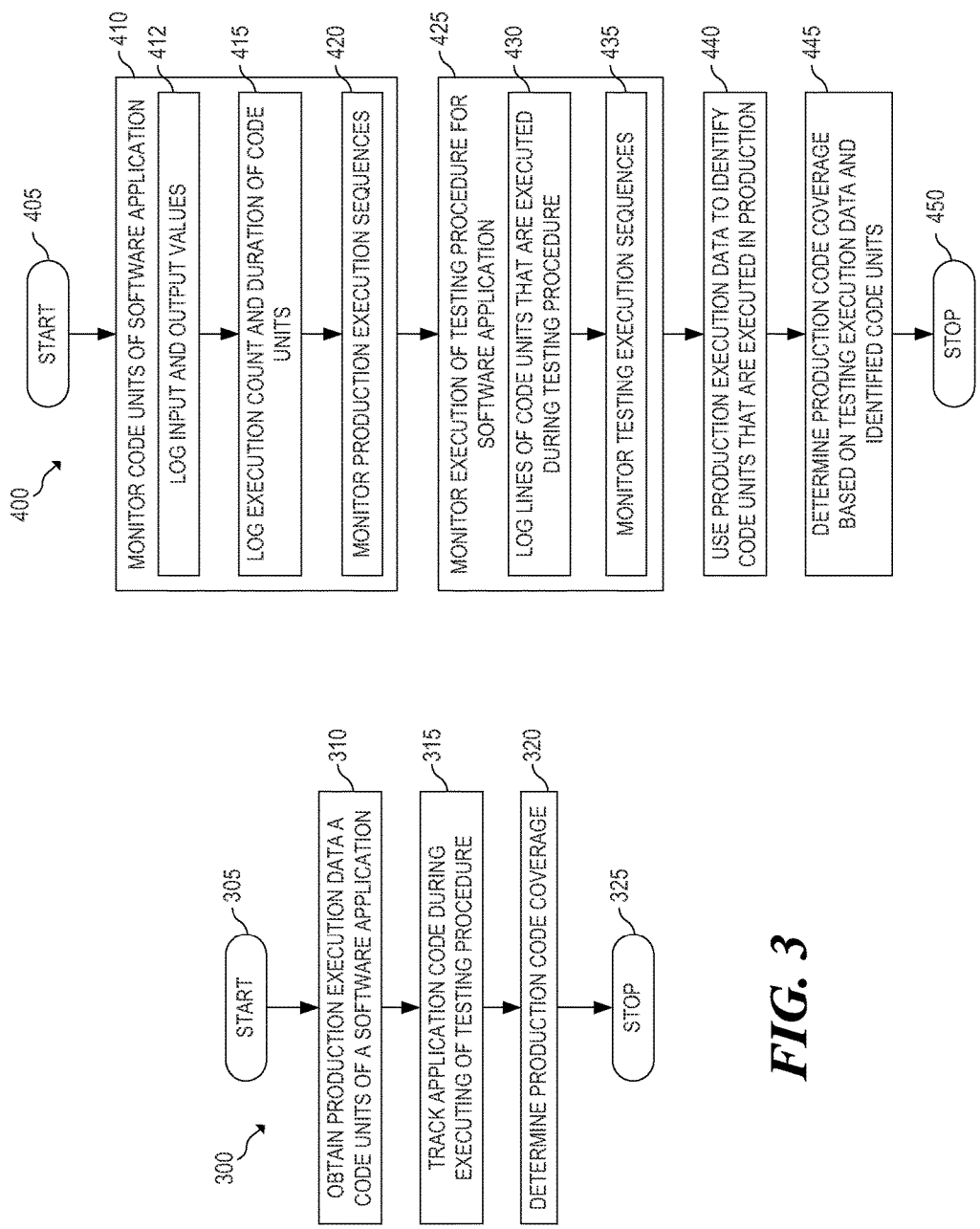

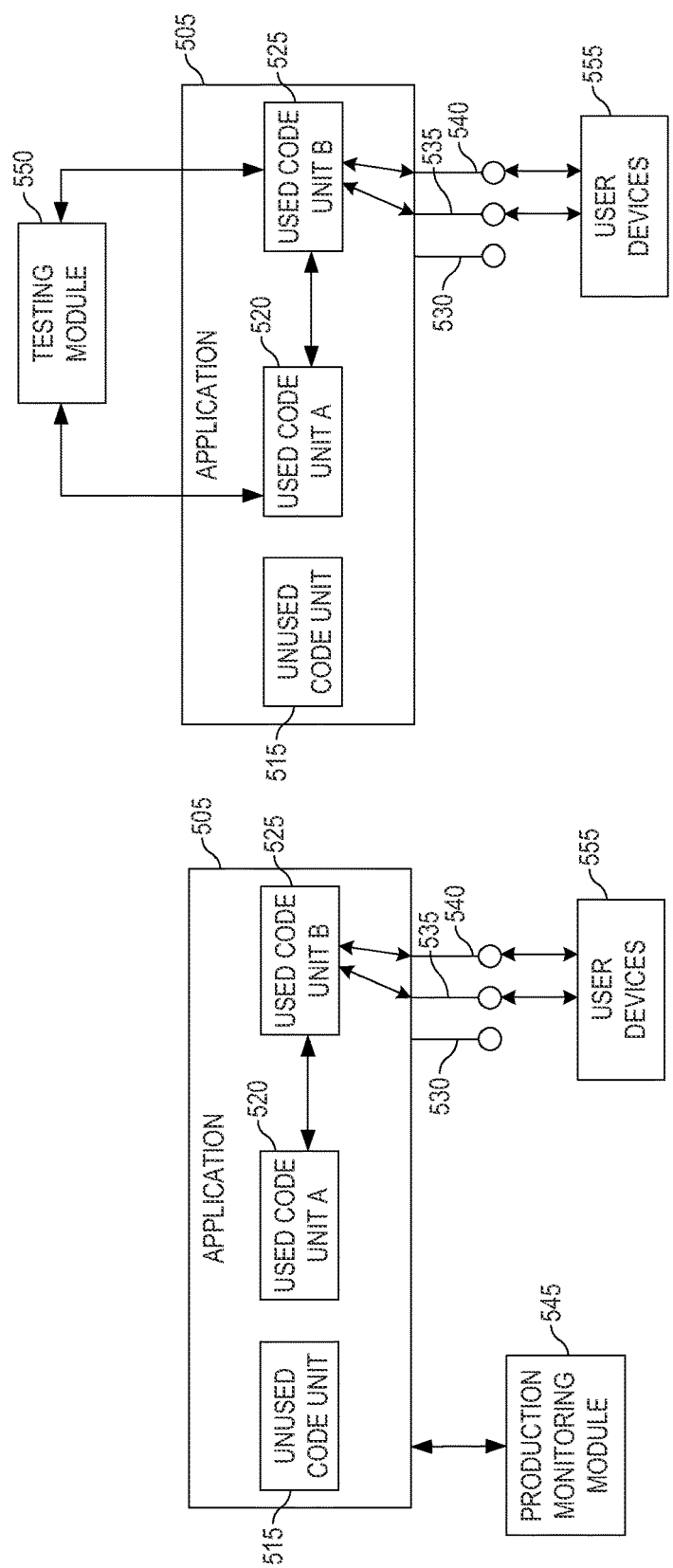

PRODUCTION SAMPLING FOR DETERMINING CODE COVERAGE

CROSS-REFERENCE TO RELATED APPLICATION

This application is a U.S. National Stage Application of and claims priority to international Patent Application No. PCT/US2013/072390, filed on Nov. 27, 2013, and entitled "PRODUCTION SAMPLING FOR DETERMINING CODE COVERAGE," the entire contents of which are hereby incorporated in its entirety.

BACKGROUND

Various analyses can be used to ascertain code quality such as Static Code Analysis (SCA), quality assurance (QA) statistics (e.g., trend of found issues), and code coverage. Code Coverage describes the degree to which the source code of an application has been tested. Typically, code coverage is based on measuring the number of code lines covered (i.e., executed) by the application's testing procedures.

BRIEF DESCRIPTION OF THE DRAWINGS

The following detailed description references the drawings, wherein:

FIG. 3 is a flowchart of an example method for execution by a server computing device for using production sampling to determine code coverage;

FIG. 4 is a flowchart of an example method for execution by a server computing device for using production sampling to identify used code modules for determining production code coverage; and FIGS. 5A-5B are block diagrams of an example application at various stages of using production sampling to determine code coverage.

DETAILED DESCRIPTION

As discussed above, code coverage describes the degree to which the source code of an application is tested. Traditional code coverage tools are based on assumptions that may conceal deficiencies in testing procedures. For example, a coverage tool may assume that the more lines covered using testing procedures, the better the quality of the application. This assumption may be misleading because lines of code do not have the same importance. Specifically, some portions of the code are more frequently executed by real users of the application, while other portions may be rarely executed where an issue in these rarely executed portions will warrant a lower priority.

In another example, a coverage tool may assume that code executed during testing is completely and reliably isolated, which further assumes that the flow of code executed before a given line is irrelevant to the execution of the current line. Based on this assumption, current code coverage tools assume that a line of code is covered if it is executed at any point by any testing procedure; however, fully reliable isolation is rarely achievable for real world applications, and instead, an application is usually tested with only a few input sets, which allows for different code behavior to be overlooked.

Example embodiments disclosed herein determine code coverage using production sampling. For example, in some embodiments, a production execution data set that includes metrics for code units of a software application is obtained, where the metrics include input and output values for each of the code units and an average execution count for each of the code units. Further, application code execution is tracked during a testing procedure of the software application to determine executed lines of code. At this stage, production code coverage of the software application is determined based on the production execution data set and the executed lines of code.

In this manner, example embodiments disclosed herein allow production code coverage to be determined based on a statistical analysis of production execution. Specifically, by identifying portions of an application that are more frequently executed in production, code coverage that more accurately describes the effectiveness of testing procedures may be determined.

Figure 1:
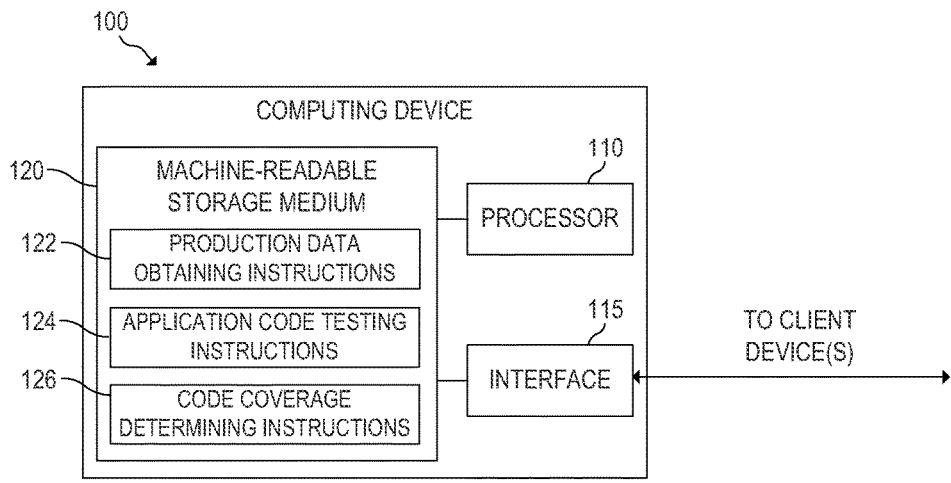
FIG. 1 is a block diagram of an example system for using production sampling to determine code coverage.

Referring now to the drawings, FIG. 1 is a block diagram of an example system for using production sampling to determine code coverage. The example system can be implemented as a computing device 100 such as a server, a notebook computer, a desktop computer, an all-in-one system, a tablet computing device, or any other electronic device suitable for using production sampling to determine code coverage. In the embodiment of FIG. 1, computing device 100 includes a processor 110, an interlace 115, and a machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 122, 124, 126 to enable using production sampling to determine code coverage. As an alternative or in addition to retrieving and executing instructions, processor 110 may include one or more electronic circuits comprising a number of electronic components for performing the functionality of one or more of instructions 122, 124, 126.

Interface 115 may include a number of electronic components for communicating with client device(s). For example, interface 115 may be an Ethernet interface, a Universal Serial Bus (USB) interface, an IEEE 1394 (FireWire) interface, an external Serial Advanced Technology Attachment (eSATA) interface, or any other physical connection interface suitable for communication with a client device. Alternatively, interface 115 may be a wireless interface, such as a wireless local area network (WLAN) interface or a near-field communication (NFC) interface. In operation, as detailed below, interface 115 may be used to send and receive data, such as application data, to and from a corresponding interface of a client device.

Machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for using production sampling to determine code coverage.

Production data obtaining instructions 122 may obtain production execution data of a software application. Production execution data may refer to data that is collected from a software application during production and may include metrics for code units of the software application. A code unit may be a portion of executable code in the software application such as a function, a procedure, a code block, etc. Examples of metrics include, but are not limited to, inputs and outputs for each of the code units, an average execution count for each of the code units, production execution sequences of the software application, fault occurrences of the software application, and an average execution time for each of the code units.

A software application may be software or a service provided by computing device 100 to client devices over a network (e.g., Internet, Intranet, etc.) via the interface 115. For example, a software application may be executed by a web server executing on computing device 100 to provide web pages to a web browser of a client device. In another example, a software application may be a web service that provides functionality in response to requests from a client device over a network. An execution sequence describes the flow of execution in the software application, which includes executed code units and the ratio of their occurrences in a measured timeframe (e.g., code unit C was executed as part of the flow [code unit A→code unit B→code unit C] 30% of the time, as part of the flow [code unit A→code unit C] 40% of the time, and as code unit C only 30% of the time).

Application code testing instructions 124 may monitor the execution of testing procedures of the software application. Specifically, the execution of the testing procedures may be tracked to identify (1) lines of the software application that are executed in response to requests from the testing procedures and (2) execution sequences in the software application during testing. For example, time stamps and corresponding function names may be logged (i.e., instrumentation log) during invocation of functions in the software application. In this example, the instrumentation log may be used to determine both the lines executed in response to an invocation and the resulting execution sequence.

Code coverage determining instructions 126 may determine code coverage for a testing procedure based on the data collected by instructions 122 and 124. Specifically, the production code coverage of the testing procedure may be determined as the portion of statistically relevant code units that are executed during the testing procedure. In this case, statistically relevant code units refer to code units that are executed at a minimum threshold level during production. For example, statistically relevant code units may be all code units that are executed at least once while the software application is in production. In this example, production code coverage more accurately reflects the effectiveness of the testing procedure because the coverage determination ignores code units that are never executed by the software application.

Figure 2:
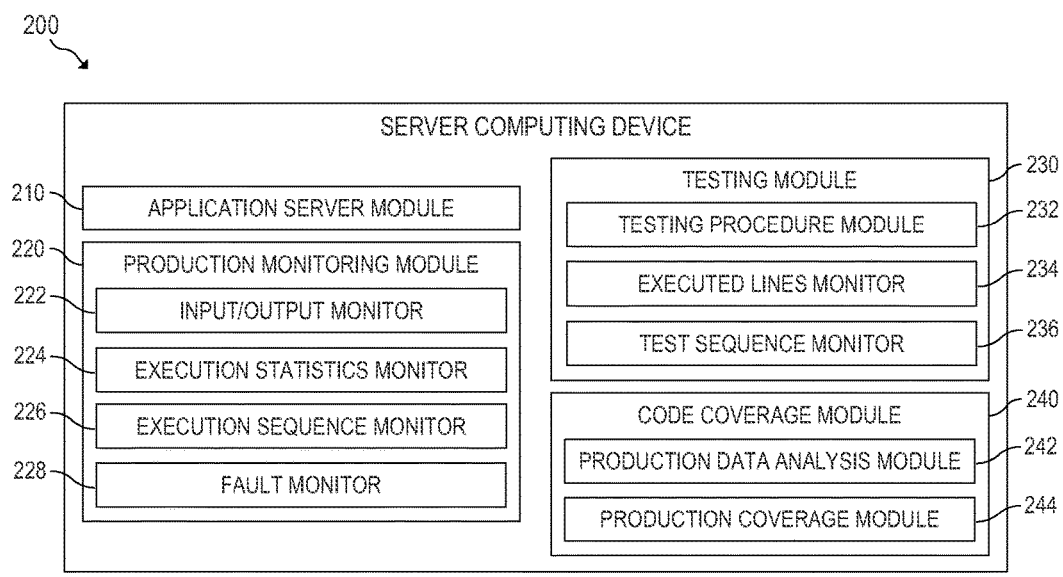
FIG. 2 is a block diagram of an example server computing device including modules for performing aspects of using production sampling to determine code coverage.

FIG. 2 is a block diagram of an example computing device 200 including modules for performing aspects of using production sampling to determine code coverage. As with computing device 100 of FIG. 1, computing device 200 may be any electronic device suitable for using production sampling to determine code coverage.

Application server module 210 may be a server software application configured to provide a software application to client devices. The software application may be provided as thin or thick client software, web pages, or web services over a network. The application server module 210 may provide the software application based on source code (e.g., HTML files, script files, etc.) or object code (e.g., linked libraries, shared objects, executable files, etc.) generated from source code. For example, the application server module 210 may provide web pages based on HTML files, which may include embedded scripts that are executed by the application server module 210 to generate dynamic content for the client devices. In another example, the application server module 210 may expose an interface to a web service that triggers execution of a function in a linked library in response to receiving a request from a client device.

As illustrated in FIG. 2 and described in detail below, computing device 200 may also include a number of modules 220-244. Each of the modules may include a series of instructions encoded on a machine-readable storage medium and executable by a processor of computing device 200. In addition or as an alternative, each module 220-244 may include one or more hardware devices comprising electronic circuitry for implementing the functionality described below. In some cases, the modules 220-244 may be implemented as a distributed system across multiple computing devices.

Monitoring module 220 may monitor the execution of a software application provided by the application server module 210. Although the components of monitoring module 220 are described in detail below, additional details regarding an example implementation of monitoring module 220 are provided above with respect to instructions 122 of FIG. 1.

Input/output monitor 222 may monitor the inputs and outputs of code units for the software application during production. For example, the input/output monitor 222 may track the arguments provided to and the results provided by functions of the software application. In some cases, the input/output monitor 222 may use an application programming interface (API) to determine the inputs and outputs of code units. In other cases, the input/output monitor 222 may access input/output logs that are generated during the software application during execution. For example, the software application may be executed in a debug mode that logs various parameters of each function call, which includes function names, execution timestamps, and the arguments and results of function calls. For a particular code unit, average and rare input and output values may be collected to provide historical data for the code unit.

Execution statistics monitor 224 may collect execution statistics for a software application such as execution counts and execution times for code units. An execution count for a code unit may describe the number of times the code unit was executed in production. An execution time of a code unit may describe the average quantity of time that the code unit is executed in response to an invocation in production. Similar to the input/output monitor 222, execution statistics monitor 224 may obtain the statistics from an API and/or logs of the software application. In some cases, the execution statistics may be determined based on the parameters of the code units identified by input/output monitor 222. For example, function names and timestamps for invocations of those functions may be used to determined execution counts and execution times for the functions.

Execution sequence monitor 226 may monitor the execution sequences of the software application. As described above with respect to FIG. 1, an execution sequence describes the flow of execution in the software application, which includes executed code units and the ratio of their occurrences in a measured timeframe. Execution sequence monitor 226 may use the parameters for code units that are collected by input/output monitor 222 to determine the execution sequences of the software application. In some cases, execution sequence monitor 226 may integrate with instrumentation monitoring tools and record information about which portions of application code are executed when a synthetic monitor is executed. Synthetic monitors are scripts or flows executed from an end-user perspective in a production environment, where the monitors alert IT personnel when the user experience is degraded.

In some cases, execution sequences may be determined using real user monitoring (RUM) and deep code diagnostics with synthetic monitors. RUM traces the actual execution of real users in production by, for example, duplicating network traffic of the monitored application. RUM can be further enhanced with code diagnostics to link the code execution with the user transactions. For example, RUM can be used to link code executed by the monitored application to transaction signatures (e.g., an API call and arguments), which are further linked to synthetic monitors using a record of calls by the synthetic monitors to the server. In this example, RUM serves as the man-in-the-middle for linking synthetic monitors and application code traced by deep code diagnostics.

Fault monitor 228 may monitor the software application for fault occurrences (i.e., exceptions) of code units. For example, the fault occurrences may be detected as exceptions thrown by the software application during execution. In this example, the exceptions may include execution parameters (e.g., current line being executed, current function, memory stack, etc.) that are collected by fault monitor 228. In another example, an infrastructure monitor may detect faults on server computing device 200 and then identify likely causes of the fault on the network.

Testing module 230 may manage testing procedures for software applications provided by the application server module 210. Although the components of testing module 230 are described in detail below, additional details regarding an example implementation of testing module 230 are provided above with respect to instructions 124 of FIG. 1.

Testing procedure module 232 may execute testing procedures for software applications. A developer of the software application may create a testing procedure for a software application using various programming utilities. Once created, the testing procedure may be executed to simulate the actions of users of the software application. For example, sets of input parameters may be stored and provided to the software application as client requests. In this example, the execution of the software application in response to the client requests may be monitored to analyze the effectiveness of the testing procedure.

Executed lines monitor 234 may monitor the software application to determine which lines of code are executed in response to requests from a testing procedure. The executed lines of code may be logged and associated with requests as the testing procedure is executed so that statistical analysis related to the lines of code may be performed after the testing procedure is complete. The executed lines in the software application may be identified using an API and/or execution logs of the software application.

Test sequence monitor 236 may identify execution sequences in the software application during execution of the testing procedure. Specifically, in response to requests from the testing procedures, various parameters associated with executed code units may be logged so that the execution sequences in response to the requests can be determined. The parameters logged for the testing procedures may be similar to the parameters logged for production execution by the input/output monitor 222 as described above.

Code coverage module 240 may determine code coverage of testing procedures for software applications provided by the application server module 210. Although the components of coverage module 240 are described in detail below, additional details regarding an example implementation of coverage module 240 are provided above with respect to instructions 126 of FIG. 1.

Production data analysis module 242 may perform statistical analysis of the execution data collected by the production monitoring module 220. Specifically, production data analysis module 242 may use inputs/outputs, execution statistics, and/or execution sequences to determine the code units of the software application that were executed during production. The executed code units are identified so that further calculations performed by the production coverage module 244 may provide coverage determinations that are more relevant to how the software application behaves in production.

Production coverage module 244 may determine the production code coverage of testing procedures based on the code units of the software application executed during production and the testing procedure data collected by executed lines monitor 234 and test sequence monitor 236 as described above. For example, the code lines executed in response to requests from a testing procedure and the resulting execution sequences may be used to determine the proportion of executed code units in production that are tested by the testing procedure (i.e., production code coverage). Production code coverage more accurately describes the effectiveness of the testing procedure because it ignores code units in the software application that are not typically executed during production. Production coverage module 244 may also determine execution sequence coverage based on the production execution sequences and the testing execution sequences. Execution sequence coverage describes the proportion of production execution sequences that were at least partially mirrored during a testing procedure.

FIG. 3 is a flowchart of an example method 300 for execution by a computing device 100 for using production sampling to determine code coverage. Although execution of method 300 is described below with reference to computing device 100 of FIG. 1, other suitable devices for execution of method 300 may be used, such as server computing device 200 of FIG. 2. Method 300 may be implemented in the form of executable instructions stored on a machine-readable storage medium, such as storage medium 120, and/or in the form of electronic circuitry.

Method 300 may start in block 305 and continue to block 310, where computing device 100 obtains production execution data of a software application. The production execution data may include metrics for code units of the software application such as inputs and outputs for each of the code units, an average execution count for each of the code units, production execution sequences of the software application, fault occurrences of the software application, and an average execution time for each of the code units.

In block 315, the execution of testing procedures of the software application may be monitored. Specifically, the execution of the testing procedures may be tracked to identify (1) lines of the software application that are executed in response to requests from the testing procedures and (2) execution sequences in the software application during testing. Next, in block 320, production code coverage for the testing procedure may be determined based on the production execution data and executed lines and execution sequences of the software application during testing. Production code coverage of the testing procedure may describe the portion of statistically relevant code units (i.e., code units that are executed during production) that are executed during the testing procedure. Method 300 may then proceed to block 325, where method 300 stops.

FIG. 4 is a flowchart of an example method 400 for execution by a server computing device 200 for tracing source code for using production sampling to identify used code modules for determining production code coverage. Although execution of method 400 is described below with reference to server computing device 200 of FIG. 2, other suitable devices for execution of method 400 may be used, such as computing device 100 of FIG. 1. Method 400 may be implemented in the form of executable instructions stored on a machine-readable storage medium and/or in the form of electronic circuitry.

Method 400 may start in block 405 and proceed to block 410, where server computing device 200 monitors code units of the software application to obtain production execution data. The monitoring may be achieved using various programming utilities such as application performance management software, network management software, enterprise asset management software, information technology (IT) service management software, etc. The code units of the software application are monitored while the application is in production to determine which code units are actually executed and relevant to the use of the application.

Included in the production monitoring, input and output values of the code units are monitored in block 412. For example, arguments and return values of functions executed during production can be logged. In block 415 and also included in the production monitoring, the execution count and execution duration of the code units are monitored. In this case, the logged data for a code unit may be used to determine (1) a total count of the number of times the code unit is executed and (2) the average duration of execution for the code unit. Further included in the production monitoring, production execution sequences of the software application are determined in block 420. An execution sequence of the software application can be determined based on the code units that are invoked in response to a client request (i.e., the resulting flow of execution through the software application after the client request). In some cases, each of the sub-blocks of 410 may be performed in parallel as log data is collected by monitors of the software application.

In block 425, server computing device 200 monitors the execution of a testing procedure of the software application to obtain testing execution data. The testing procedure can be, for example, executed by automated testing software that simulates user interactions. As the user interactions are simulated, the testing software may monitor the software application to collect log data related to the execution of code units.

Included in the testing monitoring, lines of the code units that are executed during the testing procedure are logged in block 430. The logs for the lines of the code units may, for example, identify the client request that initiated the current execution and corresponding debug information for parameters used in the software application. In block 435 and also included in the testing monitoring, the execution sequences of the software application may be determined. In this example, an execution sequence may be determined based on the code lines and debug information logged as described above.

In block 440, the production execution data is used to identify code units that are executed during production. For example, the execution counts of the code units and the execution sequences of the software application can be used to identify the code units of the software application that were executed during production. Next, in block 445, code coverage for the testing procedure may be determined based on the testing execution data and identified code units. Specifically, production code coverage may be calculated as the proportion of identified code units that were accessed during the testing procedure according to the testing execution data. For example, the following function may be used to calculate production code coverage:

$$\text{Coverage}(UCs) = \frac{\sum_{i=1}^{n}(PE(UC_i) \cdot 1_{TestUCs}(UC_i))}{\sum_{i=1}^{n} PE(UC_i)}$$

Where $UC_i$ is a particular code unit, PE(UC) is a natural-number function that returns the number of sessions that executed the UC at least once, TE(UC) is a Boolean function that returns 0 if and only if none of the tests executed the UC (i.e., otherwise it returns 1). The above formula is a weighted mean of the code units that were executed during production, where the weight equals the number of sessions that executed each code unit.

In addition to production code coverage, execution sequence coverage may also be determined in block 445. Execution sequence coverage describes the proportion of production execution sequences that were at least partially mirrored during the testing procedure. For example, the following function may be used to calculate execution sequence coverage:

$$\text{Coverage}(PFs, TFs) = \frac{\sum_{i=1}^{n} \text{Max}_{j=1}^{m}(flowDinstance(PF_i, TF_j))}{|PFs|}$$

Where an execution sequence (i.e., flow) a sequence of code units (e.g., $UC_1, UC_2, \ldots, UC_z$), PF is the set of flows that were executed in production (i.e., $\{PF_1, PF_2, \ldots, PF_n\}$), TF is the set of flows that were executed during testing (i.e., $\{TF_1, TF_2, \ldots, TF_m\}$), and flowDistance(PF,TF) is a [0,1] function that returns the distance between a particular PF and TF, where 1 signifies that TF covers PF and 0 signifies that the TF and PF are completely different sequences. In this example, flowDistance(PF,TF) may return 1 if PF=TF or TF contains PF; otherwise, the function returns the value shown in the following formula:

$$\left(\frac{|PF| - \text{Min}(LevenshteinDistance(PF, TF), |PF|)}{|PF|}\right)^2$$

Levenshtein distance is a metric for assessing the difference between two sequences. In this case, Levenshtein distance is the minimum number of modifications that should be performed to match a first execution sequence to a second execution sequence (i.e., a lower Levenshtein distances indicates that the sequences are more similar).

Method 400 may then proceed to block 450, where method 400 stops.

FIGS. 5A-5B are block diagrams of an example software application at various stages of using production sampling to determine code coverage. FIG. 5A depicts the application 505 in production, where the application 505 includes unused code unit 515, used code unit A 520, and used code unit B 525. Used code unit A 520 is shown to interact with used code unit B 525. For example, used code unit B 525 may invoke used code unit A 520, which then returns output back to used code unit B 525. Production monitoring module 545 may monitor the application 505 during production to collect production execution data. Application 505 also shows data entry points 530, 535, 540 that are exposed when the application 505 is in production. As the data entry points 530, 535, 540 are accessed by user devices 555, used code unit A 520 and used code unit B 525 may be executed to satisfy the requests of the user devices 555.

FIG. 5B depicts the application 505 during execution of a testing procedure, where the application 505 again includes unused code unit 515, used code unit A 520, and used code unit B 525. Again, the data entry points 530, 535, 540 are accessible to user devices 555, which in FIG. 5B may include synthetic monitors. As the data entry points 530, 535, 540 are accessed, testing module 550 may monitor the execution of used code unit A 520 and used code unit B 525 to determine if the code units are executed during the testing procedure.

The foregoing disclosure describes a number of example embodiments for tracing source code for using production sampling to determine code coverage. In this manner, the embodiments disclosed herein enable the effectiveness of a testing procedure to be more accurately assessed by ignoring code units that are not used during production.

We claim:

1. A system for determining code coverage, the system comprising: a processor to:
  obtain a production execution data set determined from production sampling of a software application during execution in a production environment, wherein the production execution data set comprises a plurality of metrics for a plurality of code units of the software application, wherein the plurality of metrics comprises input and output values for each of the plurality of code units, an average execution count for each of the plurality of code units, and a plurality of production execution sequences for the software application;
  track application code execution during a testing procedure of the software application to determine a plurality of executed lines of code and a plurality of testing execution sequences for the testing procedure, wherein the plurality of testing execution sequences are determined by tracing actual execution of real users in production by duplicating network traffic of the software application, and wherein the testing procedure is executed by automated testing software that collects log data related to the execution of the plurality of code units, and further wherein the log data identifies client requests that initiated a current execution and corresponding debug information for parameters used in the software application;
  determine production code coverage of the software application based on the production execution data set and the plurality of executed lines of code, including using the production execution data set to determine a subset of the plurality of code units that are executed during the production environment execution of the software application, wherein the production code coverage is determined by performing a weighted mean of the subset of the plurality of code units, and wherein a weight of each code unit in the subset is a number of sessions that executed the code unit; and
  determining execution sequence coverage of the software application based on the plurality of production execution sequences and a plurality of testing execution sequences for the testing procedure.

2. The system of claim 1, wherein the plurality of metrics further comprises a plurality of fault occurrences for the software application and an average execution time for each of the plurality of code units.

3. The system of claim 1, wherein tracking the application code execution during the testing procedure comprises sampling the application code execution to obtain a testing sample that represents typical code execution.

4. A non-transitory machine-readable storage medium encoded with instructions executable by a processor for determining code coverage, the machine-readable storage medium comprising instructions to:
  obtain a production execution data set determined from production sampling of a software application during execution in a production environment, wherein the production execution data set comprises a plurality of metrics for a plurality of code units of a software application, wherein the plurality of metrics comprises input and output values for each of the plurality of code units and an average execution count for each of the plurality of code units;
  track application code execution during a testing procedure of the software application to determine a plurality of executed lines of code and a plurality of testing execution sequences for the testing procedure, wherein the plurality of testing execution sequences are determined by linking code that is executed by the software application to transaction signatures that are further linked to a synthetic server monitor, and wherein the testing procedure is executed by automated testing software that collects log data related to the execution of the plurality of code units, and further wherein the log data identifies client requests that initiated a current execution and corresponding debug information for parameters used in the software application;
  determine production code coverage of the software application based on the production execution data set and the plurality of executed lines of code, including using the production execution data set to determine a subset of the plurality of code units that are executed during the production environment execution of the software application, wherein the production code coverage is determined by performing a weighted mean of the subset of the plurality of code units, and wherein a weight of each code unit in the subset is a number of sessions that executed the code unit; and
  determining execution sequence coverage of the software application based on the plurality of production execution sequences and a plurality of testing execution sequences for the testing procedure.

5. The non-transitory machine-readable storage medium of claim 4, wherein the plurality of metrics further comprises a plurality of fault occurrences for the software application and an average execution time for each of the plurality of code units.

6. The non-transitory machine-readable storage medium of claim 4, wherein tracking the application code execution during the testing procedure comprises sampling the application code execution to obtain a testing sample that represents typical code execution.

7. A method for assessing dynamic security scans using runtime analysis and static code analysis, the method comprising:
   obtaining a production execution data set determined from production sampling of a software application during execution in a production environment, wherein the production execution data set comprises a plurality of metrics for a plurality of code units of a software application, wherein the plurality of metrics comprises input and output values for each of the plurality of code units, an average execution count for each of the plurality of code units, and a plurality of production execution sequences for the software application;
   tracking application code execution during a testing procedure of the software application to determine a plurality of executed lines of code and a plurality of testing execution sequences for the testing procedure, and wherein the testing procedure is executed by automated testing software that collects log data related to the execution of the plurality of code units, and further wherein the log data identifies client requests that initiated a current execution and corresponding debug information for parameters used in the software application;
   determining production code coverage of the software application based on the production execution data set and the plurality of executed lines of code, including using the production execution data set to determine a subset of the plurality of code units that are executed during the production environment execution of the software application, wherein the production code coverage is determined by performing a weighted mean of the subset of the plurality of code units, and wherein a weight of each code unit in the subset is a number of sessions that executed the code unit; and
   determining execution sequence coverage of the software application based on the plurality of production execution sequences and a plurality of testing execution sequences for the testing procedure.

8. The method of claim 7, wherein the plurality of metrics further comprises a plurality of fault occurrences for the software application and an average execution time for each of the plurality of code units.

9. The method of claim 7, wherein determining the production code coverage comprises using the plurality of executed lines of code to determine a covered portion of the subset of the plurality of code units that are executed during the testing procedure.

10. The method of claim 7, wherein tracking the application code execution during the testing procedure comprises sampling the application code execution to obtain a testing sample that represents typical code execution.

* * * * *